United States Patent
Shaw et al.

(10) Patent No.: US 8,721,878 B2
(45) Date of Patent: May 13, 2014

(54) APPARATUS AND METHOD FOR RECOVERY OF SUB-SURFACE OIL POLLUTION

(76) Inventors: Mark D. Shaw, Ponte Vedra Beach, FL (US); J. Tad Heyman, Atlantic Beach, FL (US)

(*) Notice: Subject to any disclaimer, the term of this patent is extended or adjusted under 35 U.S.C. 154(b) by 302 days.

(21) Appl. No.: 13/199,533

(22) Filed: Sep. 1, 2011

(65) Prior Publication Data
US 2012/0048789 A1  Mar. 1, 2012

Related U.S. Application Data

(60) Provisional application No. 61/402,609, filed on Sep. 1, 2010.

(51) Int. Cl.
| E02B 15/04 | (2006.01) |
| C02F 1/40 | (2006.01) |
| C02F 1/28 | (2006.01) |
| C02F 103/00 | (2006.01) |
| C02F 101/32 | (2006.01) |

(52) U.S. Cl.
CPC ............... C02F 1/40 (2013.01); E02B 13/048 (2013.01); *C02F 1/285* (2013.01); *C02F 2103/007* (2013.01); *C02F 2101/32* (2013.01); *Y10S 210/923* (2013.01); *Y10S 210/924* (2013.01)
USPC ............... 210/122; 210/170.11; 210/242.3; 210/242.4; 210/923; 210/924

(58) Field of Classification Search
USPC .............. 210/122, 170.05, 170.09, 170.11, 210/242.1, 242.3, 242.4, 485, 747.5, 747.6, 210/776, 923, 924; 405/60
See application file for complete search history.

(56) References Cited

U.S. PATENT DOCUMENTS

| 3,523,611 | A | * | 8/1970 | Fitzgerald | 210/242.3 |
| 3,557,960 | A | * | 1/1971 | Fitzgerald et al. | 210/242.3 |
| 3,612,280 | A | * | 10/1971 | Fitzgerald et al. | 210/242.3 |
| 3,730,346 | A | * | 5/1973 | Prewitt | 210/242.3 |
| 4,053,412 | A | * | 10/1977 | Stix | 210/242.1 |
| 4,211,659 | A | * | 7/1980 | Nyfeldt et al. | 210/242.3 |
| 4,362,631 | A | * | 12/1982 | Bocard et al. | 210/776 |
| 5,043,060 | A | * | 8/1991 | Brennan | 210/242.1 |
| 5,985,157 | A | * | 11/1999 | Leckner et al. | 210/485 |
| 6,086,758 | A | * | 7/2000 | Schilling et al. | 210/485 |
| 6,632,501 | B2 | * | 10/2003 | Brownstein et al. | 428/74 |
| 2010/0054961 | A1 | * | 3/2010 | Palecek et al. | 417/61 |
| 2011/0309006 | A1 | * | 12/2011 | Crouse | 210/170.05 |

* cited by examiner

*Primary Examiner* — Christopher Upton
(74) *Attorney, Agent, or Firm* — Thomas C. Saitta

(57) ABSTRACT

A subsurface hydrocarbon capture apparatus having a filtration member connected to a mouth frame, wherein the filtration member is composed of a material that is hydrophobic and lipophilic, the apparatus having buoyancy and weight members to maintain the apparatus in a subsurface disposition when pulled by a boat.

19 Claims, 2 Drawing Sheets

APPARATUS AND METHOD FOR RECOVERY OF SUB-SURFACE OIL POLLUTION

This patent application claims the benefit U.S. Provisional Patent Application Ser. No. 61/402,609, filed Sep. 1, 2010.

BACKGROUND OF THE INVENTION

This invention relates generally to the field of apparatuses and methods for recovering oil leaks or spills, particularly leaks or spills in large bodies of water, and more particularly to any such apparatuses and methods adapted to recover oil plumes situated below the water surface.

As evidenced by the increasing number of oil tanker accidents, pipeline leaks and drilling catastrophes, an example of which recently occurred in the Gulf of Mexico, there is a serious need for means and methods to contain and recover oil or other hydrocarbon products from large bodies of water. To date, most solutions have been directed at floating surface oil or oil that has washed ashore. It has been discovered that because of natural dispersion, degradation and emulsification, leaks located at significant depths, or chemical dispersants applied to the surface oil, significant amounts of hazardous oil from a large spill will remain dispersed at distances below the surface of the water, sometimes thousands of feet down. The negative impact of such sub-surface oil is not yet fully known, but estimates and hypotheses purport that the damage may be catastrophic.

It is known to utilize surface skimmers pulled behind boats to skim and absorb oil off the water surface. These devices typically comprise floating booms or other floating or surface oriented devices. The known devices and methods are ineffective against sub-surface oil plumes.

One of objects of this invention is to provide apparatuses and methods to capture and remove the sub-surface oil in an effective manner.

SUMMARY OF THE INVENTION

The invention is an apparatus and method shown and described in various embodiments, the apparatus and method providing a means for the capture and removal of oil, hydrocarbons or similar hazardous pollutants that are dispersed beneath the surface of a body of water. In general, the seine-like sub-surface apparatus comprises a filtration member connected to a mouth frame member whereby the mouth frame defines a relatively large opening for the interior of the filtration member. The filtration member is preferably configured to have a conical, elongated, rectangular or similar shape such that the surface area of the filtration member exceeds the area of opening defined by the mouth frame. The filtration member is composed of a material that retains hydrocarbons but allows water to pass through. Tow lines are attached to the mouth frame for attachment to a towing boat such that the apparatus can be pulled behind the boat.

The apparatus is provided with buoyancy members and weight members such that the residence depth of the apparatus when pulled through the water can be raised or lowered by adjusting the amount of buoyancy or weight. In various embodiments the buoyancy members may be attached singly or in combination to the mouth frame, the filtration member, a filtration support fabric member, a rigid support frame member, or a cage support member. The apparatus may be provided with air conduits in communication between air supply means and the buoyancy members.

DETAILED DESCRIPTION OF THE INVENTION

With reference to the drawings, the apparatus and method embodiments will now be described in detail with regard for the best mode and the preferred embodiment. The apparatus and method provide a means for the sub-surface capture and removal of oil, hydrocarbons or similar hazardous pollutants that are dispersed beneath the surface of a body of water. In general, the seine-like sub-surface hydrocarbon capture apparatus comprises a filtration member connected to a mouth frame member, the filtration member being composed of a material that retains hydrocarbons but allows water to pass through, buoyancy members to adjust the residence depth of the apparatus when it is being towed by a boat.

Figure 1:
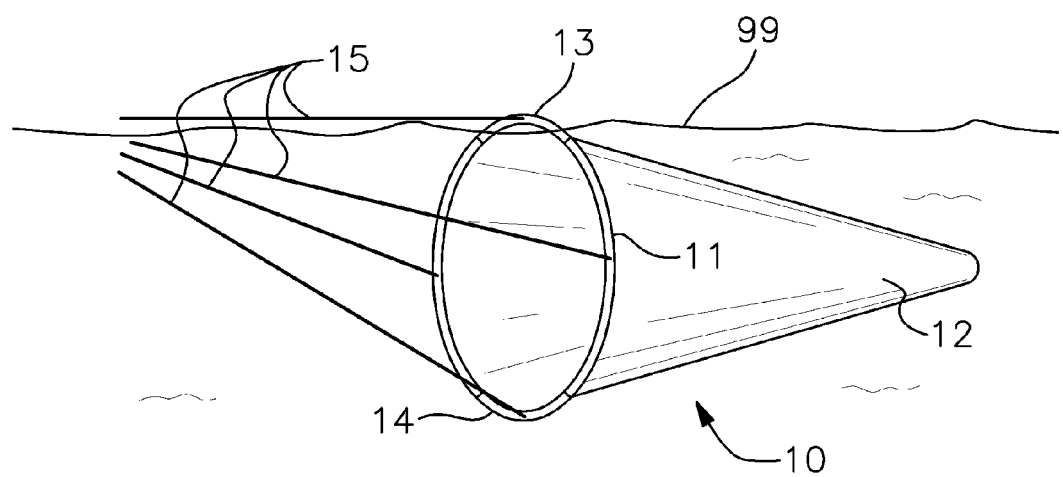
FIG. 1 illustrates a first embodiment of the invention.

A first embodiment is shown in FIG. 1. In this embodiment, the sub-surface hydrocarbon capture apparatus 10 comprises a pouch-like filtration member 12 mounted onto a mouth frame member 11. The mouth frame member 11 is preferably a substantially rigid member having sufficient structural strength to maintain an open configuration when the apparatus 10 is pulled through the water. FIG. 1 illustrates the mouth frame member 11 as circular, but other open configurations, such as oval, rectangular, etc. would also be suitable. The filtration member 12 in FIG. 1 is illustrates as being conical, but other configurations such as elongated, rectangular, etc. would also be suitable. The surface area of the filtration member is greater and should be significantly greater than the area of the opening defined by the mouth frame member 11.

At least one tow line member 15 is connected to the mouth frame member 11, the tow lines 15 being of sufficient length and strength such that the apparatus 10 can be pulled through the water behind a boat. In the embodiment of FIG. 1, buoyancy members 13 are connected to the mouth frame 11. The buoyancy members may comprise any suitable floatation material or substance, such as a polymer foam material, but preferably comprise inflatable air chambers that allow the amount of floatation to be adjusted as needed to control the depth of the apparatus 10 during use, as well as to account for changes in the weight of the apparatus 10 as large amounts of hydrocarbons are captured by the filtration member 12. When necessary, weight members 14 are connected to the mouth frame 11 to maintain the mouth frame member 11 in proper orientation during use.

The filtration member 12 is composed of a material that captures hydrocarbons through adsorption or absorption while allowing water to pass through the filtration member 12. In other terms, the filtration member 12 material of composition is lipophilic and hydrophobic. A suitable material of composition is a material sold under the brand name X-TEX, which is described in detail in U.S. Pat. No. 6,632,501, the disclosure of which is incorporated herein by reference. The thickness and density of the material, and thereby the water flow properties, will be chosen with regard for the size and configuration of a particular apparatus 10.

Figure 2:
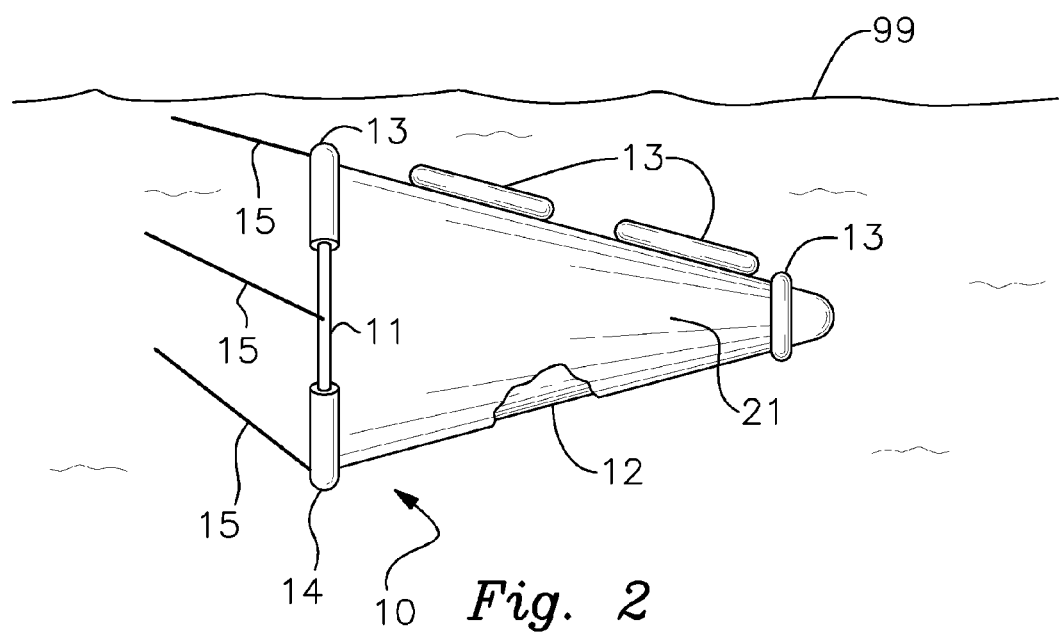
FIG. 2 illustrates a second embodiment, this embodiment comprising additional buoyancy members and a flexible and porous support fabric member encompassing the filtration member, with the apparatus shown in use below the water surface.

To utilize the apparatus 10, it is connected to a tow boat. The buoyancy member or members 13 and the weight member or members 14 are suitably chosen dependent on the desired residence depth for the apparatus 10 during use. For oil plumes or dispersions near the water surface 99, the apparatus 10 may be configured such that the buoyancy members 13 reside at the water surface 99. For deeper dispersions, the residence depth of he apparatus 10 is set such that it resides beneath the water surface 99, as shown in FIG. 2. The apparatus 10 may be utilized at depths hundreds or even thousands of feet below the water surface 99 if needed.

In an alternative embodiment shown in FIG. 2, the apparatus 10 further comprises a porous, flexible fabric or mesh support member 21 having high tensile strength. In circumstances where the material of composition of the filtration member 12 does not possess suitable strength to withstand the water flow pressure encountered when the apparatus 10 is pulled through the water, a flexible support member 21 composed of a material that can withstand the pressure is utilized to retain the filtration member 12, the flexible support member 21 being configured to correspond with the configuration of the filtration member 12. Furthermore, additional buoyancy members 13 may be connected to the body of the flexible support member 21 to better maintain the proper orientation of the apparatus 10 during use.

Figure 3:
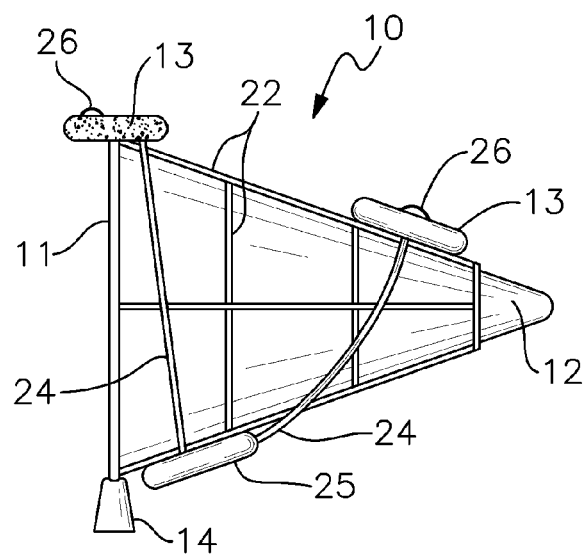
FIG. 3 illustrates a third embodiment, this embodiment comprising a rigid support framework encompassing the filtration member.

FIG. 3 illustrates still another embodiment of the apparatus 10, wherein a substantially rigid support framework 22, composed for example of metal or plastic tubing, is provided to retain the filtration fabric 12 and prevent damage during use. As also illustrated in FIG. 3, the apparatus 10 may further comprise a compressed air tank or similar air supply apparatus 25 having air conduits 24 in communication with the buoyancy members 13. The air tank 25 may be remotely operated or may be operated in response to a depth or pressure sensor, whereby additional air may be delivered to the buoyancy members 13 in order raise the relative position of the apparatus 10. In similar manner, the buoyancy members 13 may be provided with air valves 26, likewise operated remotely or in response to depth or pressure, such that air may be released to lower the apparatus 10 and the buoyancy members 13 act as ballast tanks.

Figure 4:
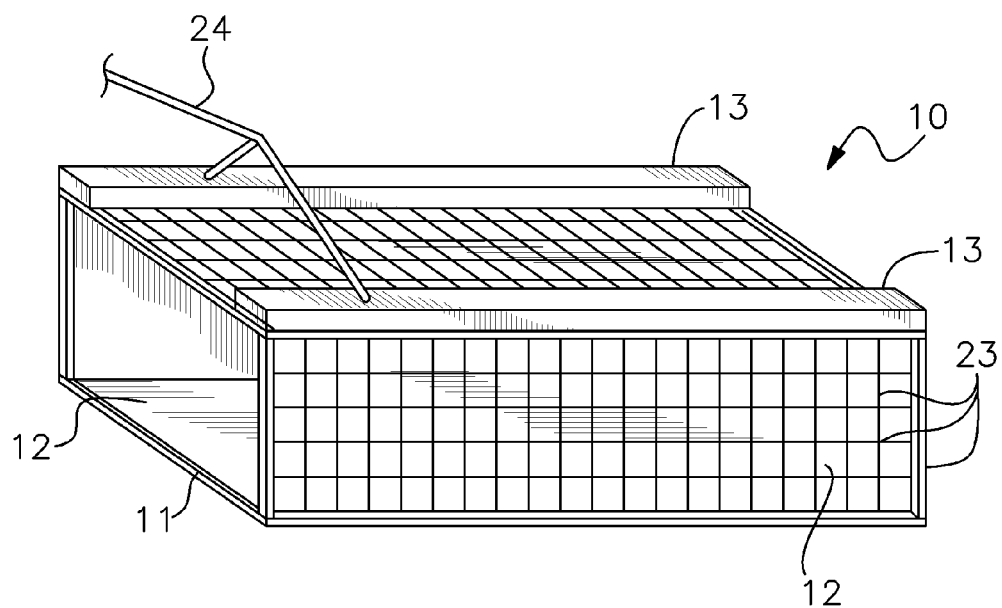
FIG. 4 illustrates a fourth embodiment, this embodiment comprising a support cage encompassing the filtration member and air conduits in communication with the buoyancy members.

In yet another embodiment as shown in FIG. 4, the apparatus 10 may comprise a substantially rigid cage support member 23, shown in the illustration as having a rectangular configuration, although other configurations such as cylindrical, square, etc. would also be suitable. The cage support member 23 may be formed for example, with metal or plastic edge members and wire mesh panels. In this embodiment, the buoyancy members 13 are connected to the upper portions of the cage support member 23 and an air conduit 24 is provided, the air conduit 24 being in communication with the buoyancy members 13 and extending to the tow boat whereby additional air can be supplied to the buoyancy members 13 from an air supply source on the boat when it is desirable to provide more buoyancy to the apparatus 10, such as when raising the apparatus 10 to remove it from the water.

In still another alternate embodiment, loose fabric sheets or strips may be attached behind the mouth frame 11 that would billow out as the apparatus is pulled through the water.

For the embodiments having a supporting member for the filtration member 12, such as the flexible support member 21, the framework support member 22 or the cage support member 23, the filtration member 12 should be removable therefrom. This allows the filtration member 21 to be replaced with a new filtration member 12 or allows the filtration member 12 to be cleaned to remove the hydrocarbons using known methods and then re-used.

The apparatus 10 may also comprise spreaders, rudders, diving wings or the like to control passage through the water when the apparatus 10 is towed. Hoists may be utilized to lower and raise the apparatus 10 as well as to hold it at the proper depth. Relief ports may be provided in the sides of the filtration member 12 and if present the flexible support member 21 to allow water to pass through if the amount of oil captured by the filtration member 12 excessively reduces water flow through the filtration member 12.

It is understood and contemplated that substitutions and equivalents for elements described above may be obvious to those of ordinary skill in the art, and therefore the true scope and definition of the invention is to be as set forth in the following claims. The examples and illustrations provided above are exemplary and not meant to be limiting.

We claim:

1. A subsurface hydrocarbon capture apparatus comprising:
   a mouth frame member having a defined opening and a filtration member attached to said mouth frame member;
   said filtration member composed of a lipophilic and hydrophobic material such that hydrocarbons coming into contact with said filtration member are adsorbed onto said filtration material while water coming into contact with said filtration member passes through said filtration member;
   a buoyancy member connected to said mouth frame member, said buoyancy member maintaining said filtration member entirely submerged at a subsurface depth when pulled through the water; and
   at least one tow line connected to said mouth frame member such that said apparatus may be pulled through the water.

2. The apparatus of claim 1, further comprising a weight member connected to said mouth frame member.

3. The apparatus of claim 1, wherein the surface area of said filtration member is greater than the area of the opening defined by the mouth frame member.

4. The apparatus of claim 1, further comprising a flexible porous support member connected to said mouth frame member, wherein said filtration member is retained within said flexible porous support member.

5. The apparatus of claim 4, further comprising an additional buoyancy member connected to said porous support member.

6. The apparatus of claim 1, further comprising a substantially rigid support framework connected to said mouth frame member, wherein said filtration member is retained within said support framework.

7. The apparatus of claim 6, further comprising an additional buoyancy member connected to said support framework.

8. The apparatus of claim 1, further comprising a substantially cage support member connected to said mouth frame member, wherein said filtration member is retained within said cage support member.

9. The apparatus of claim 8, further comprising an additional buoyancy member connected to said cage support member.

10. The apparatus of claim 1, wherein said buoyancy member comprises an inflatable air chamber, said apparatus further comprising air conduit members in communication with said buoyancy member, whereby air can be supplied to said buoyancy member.

11. The apparatus of claim 10, said apparatus further comprising an air tank, wherein said air conduits members are also in communication with said air tank.

12. The apparatus of claim 10, said buoyancy member further comprising an air valve whereby air can be released from said buoyancy chamber.

13. A subsurface hydrocarbon capture apparatus comprising:
- a mouth frame member having a defined opening and a filtration member attached to said mouth frame member, the surface area of said filtration member being greater than the area of the opening defined by said mouth frame member;
- said filtration member composed of a lipophilic and hydrophobic material such that hydrocarbons coming into contact with said filtration member are adsorbed onto said filtration material while water coming into contact with said filtration member passes through said filtration member;
- a buoyancy member and a weight member connected to said mouth frame member, the combination of said buoyancy member and said weight member maintaining said filtration member entirely submerged at a subsurface depth when said apparatus is pulled through water; and
- at least one tow line connected to said mouth frame member such that said apparatus may be pulled through the water.

14. The apparatus of claim 13, wherein said buoyancy member comprises an inflatable air chamber, said apparatus further comprising air conduit members in communication with said buoyancy member, whereby air can be supplied to said buoyancy member.

15. The apparatus of claim 14, said apparatus further comprising an air tank, wherein said air conduits members are also in communication with said air tank.

16. The apparatus of claim 14, said buoyancy member further comprising an air valve whereby air can be released from said buoyancy chamber.

17. The apparatus of claim 13, further comprising a flexible porous support member connected to said mouth frame member, wherein said filtration member is retained within said flexible porous support member.

18. The apparatus of claim 13, further comprising a substantially rigid support framework connected to said mouth frame member, wherein said filtration member is retained within said support framework.

19. The apparatus of claim 13, further comprising a substantially cage support member connected to said mouth frame member, wherein said filtration member is retained within said cage support member.

* * * * *